United States Patent [19]

Ivanov et al.

[11] Patent Number: 4,565,491
[45] Date of Patent: Jan. 21, 1986

[54] PROPULSION INSTALLATION OF AIR-CUSHION TRANSPORT VEHICLE

[75] Inventors: Sergei K. Ivanov; Viktor E. Dudkin; Iosif A. Raskin; Valery P. Peredery, all of Donetsk, U.S.S.R.

[73] Assignee: Donetsky Nauchno-Issledovatelsky Institut Komplexnoi Mekhanizatsii Shakht, Moscow, U.S.S.R.

[21] Appl. No.: 173,163

[22] Filed: Jul. 28, 1980

[30] Foreign Application Priority Data

Sep. 10, 1979 [SU] U.S.S.R. ............................. 2804005

[51] Int. Cl.⁴ .................................................. F01D 1/04
[52] U.S. Cl. ..................................... 415/160; 415/185
[58] Field of Search ......... 415/182, 183, 185, DIG. 1, 415/209, 159, 161, 163, 151, 160

[56] References Cited

U.S. PATENT DOCUMENTS

| | | | |
|---|---|---|---|
| 2,169,232 | 8/1939 | Flanders | 415/183 X |
| 3,307,776 | 3/1967 | White | 415/DIG. 1 |
| 3,519,367 | 7/1970 | Soulez-Lariviere | 415/185 |

FOREIGN PATENT DOCUMENTS

| | | | |
|---|---|---|---|
| 2416724 | 10/1974 | Fed. Rep. of Germany | 415/161 |
| 516675 | 9/1920 | France | 415/DIG. 1 |
| 957166 | 2/1950 | France | 415/183 |
| 540707 | 10/1941 | United Kingdom | 415/161 |

*Primary Examiner*—Robert E. Garrett
*Assistant Examiner*—Joseph M. Pitko
*Attorney, Agent, or Firm*—Burgess, Ryan & Wayne

[57] ABSTRACT

There is provided a propulsion installation of an air-cushion transport vehicle wherein an axial fan having working blades is installed in an annular duct; a ring slat is positioned before said annular duct so that said annular duct and said ring slat form therebetween an annular passage the exit of which is disposed ahead of said working blades installed in said annular passage is a vane cascade made up of curved plates, with a concave portion of each being directed toward a pressure side of said working blades.

5 Claims, 5 Drawing Figures

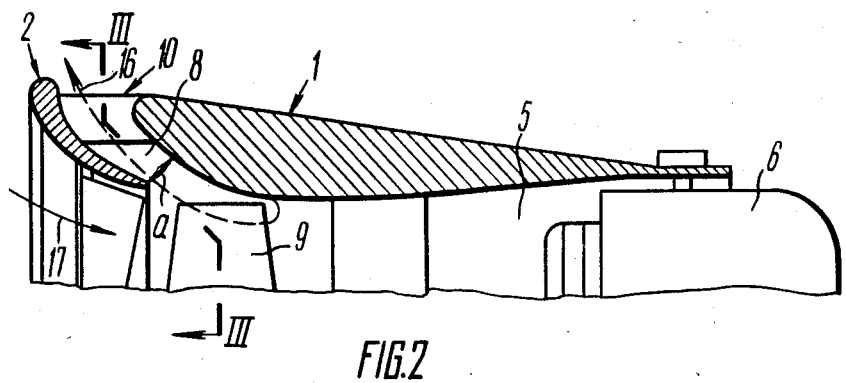
FIG.2
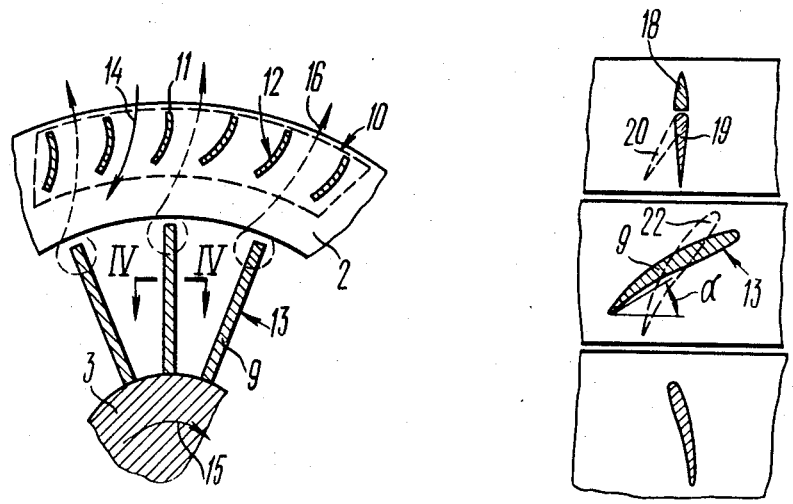
FIG.3
FIG.4

PROPULSION INSTALLATION OF AIR-CUSHION TRANSPORT VEHICLE

TECHNICAL FIELD

The present invention relates to air-cushion transport vehicles and more particularly to propulsion installations of an air-cushion transport vehicle.

INDUSTRIAL APPLICABILITY

The invention may be used in the development of air-cushion transport vehicles, self-propelled transport platforms and apparatus, in which the translatory motion is effected due to a reactive thrust produced by the ejected air stream. In such installations, the pressurized air is delivered to a reactive thrust nozzle by means of an axial fan mounted in an annular duct. For augmenting the produced reactive thrust, the annular duct is provided at the entrance with a ring slat.

BACKGROUND ART

In many countries, the air-cushion transport vehicles find various applications in different branches of economy. A factor which restrains their further application is that a comparatively low reactive thrust is produced even by propulsion installations having substantial overall dimensions.

Known to the prior art is a propulsion installation of an air-cushion transport vehicle (cf., for example, British Pat. No. 1,306,687, Cl. B 60 V 1/00, issued on Feb. 14, 1973), comprising an axial fan provided with a wheel incorporating working blades installed in an annular duct.

For effecting the reversal of a reactive thrust, the annular duct is provided at its exit with rotatable shutters closing the exit section of the annular duct and guiding the air flow in the direction of reversal.

However, at closing of the exit section by the shutters, the aerodynamic resistance of the annular duct air channel increases, bringing about a respective rise in air pressure with the result that a separation of the air flow occurs on the working blades of the axial fan and the axial fan capacity is substantially reduced and consequently the produced thrust is decreased.

To prevent occurrence of such separation of the air flow on the working blades of the axial fan, use is made of low-loaded fan wheels having a small aerodynamic angle of the working blades.

However, such fan wheels produce a relatively low reactive thrust, i.e., they are of low productivity or efficiency. In this case, to increase the reactive thrust, the diameter of an axial fan wheel has to be enlarged and, consequently, the overall size of a propulsion installation has to be increased.

It is well known that the reactive thrust produced by the wheel of an axial fan, installed in an annular duct may be substantially increased at the expense of an additional ring slat installed at the entrance a certain distance ahead of the annular duct of a propulsion installation (cf., for example, British Pat. No. 1,532,442, Cl. B 63 H 1/28, 5/14, issued on Nov. 15, 1978).

Such a ring slat allows a greater amount of air to be passed through the entrance section into the annular duct. The ring slat contributes to elimination of the breakaway of the air flow on a radius internal surface of the entrance portion of the annular duct and increases the reactive thrust of a propulsion installation.

However, further increases in the thrust in such a propulsion installation, at the cost of increasing the aerodynamic load through enlarging the angle of the working blades of an axial fan, cannot be achieved in this case because of the air flow separation at the peripheral portion of the working blades, which occurs when the shutters are turned for reversal of the reactive thrust, as was heretofore described in considering operation of the axial fan in the annular duct.

Thus, the provision of a ring slat ahead of the annular duct in a propulsion installation does not ensure an increase of the reactive thrust of a propulsion installation of an air-cushion vehicle, to the full extent.

DISCLOSURE OF THE INVENTION

It is an object of the present invention to increase the reactive thrust of a propulsion installation of an air-cushion transport vehicle.

This object is attained in a propulsion installation of an air-cushion transport vehicle, comprising an axial fan having working blades and installed in an annular duct in advance of which is positioned a ring slat defining with the annular duct an annular passage, according to the invention; installed in the annular passage is a vane cascade made up of curved plates, a concave portion of each of which is directed toward a pressure side of the working blades, with the exit of the annular passage being disposed ahead of the working blades.

Such an embodiment of the annular passage makes it possible to carry off the air flow separated on peripheral sections of the working blades under heavy aerodynamic loads. In this case, the separated portion of the air flow has a substantial velocity of spinning in the direction of rotation of the working blades, and is ejected ahead of the working blades. Passing, in this case, through the vane cascade in the annular passage, the separated air flow is straightened and does not exert an adverse effect of spinning on the main portion of the air flow passing into the entrance section of the ring slat. Due to this, a further separation of the air flow on the working blades does not develop and the axial fan continues to deliver a great amount of air through the annular duct.

Desirably, the height of an annular passage at the exit will comprise 5 to 15 percent of the inside diameter of the annular duct.

As the investigations have proved, such height of the annular passage makes it possible to obtain an increase of the reactive thrust.

The ratio of the outside diameter of the ring slat to the outside diameter of the annular duct may be in the range of 0.9 to 1.1.

The ratio equal to 0.9, may be used at high travelling speeds of an air-cushion transport vehicle. In this case, the frontal resistance of the annular duct with the ring slat will be at a minimum.

In those cases when a transport vehicle is operated at low travelling speeds, the ratio 1.1 may be taken. In this case, a rise in the frontal resistance turns out to be insignificant, whereas the reactive thrust produced by the propulsion installation is substantially increased.

With the ratio of the inside diameter of the ring slat to the inside diameter of the annular duct in the range of 1.0 to 1.1, an optimum axial length of the ring slat is ensured, depending on the selected ratio of its outside diameter in the range of 0.9 to 1.1.

Preferably, rotatable guide blades are installed in the internal flow area of the ring slat.

Such a solution may be used in those cases when the axial fan has fixed working blades. The aerodynamic load on the working blades may be changed, in this case, by turning the guide blades, allowing the angles at which the air flows to the working blades to be varied.

BRIEF DESCRIPTION OF THE DRAWINGS

The invention will now be described in greater detail with reference to specific embodiments thereof, taken in conjunction with the accompanying drawings, wherein:

FIG. 2 is a vertical section of an annular duct with a ring slat;

FIG. 3 is a section taken on the line III—III of FIG. 2;

FIG. 4 is a section taken on the line IV—IV of FIG. 3;

BEST MODE FOR CARRYING OUT THE INVENTION

Figure 1:
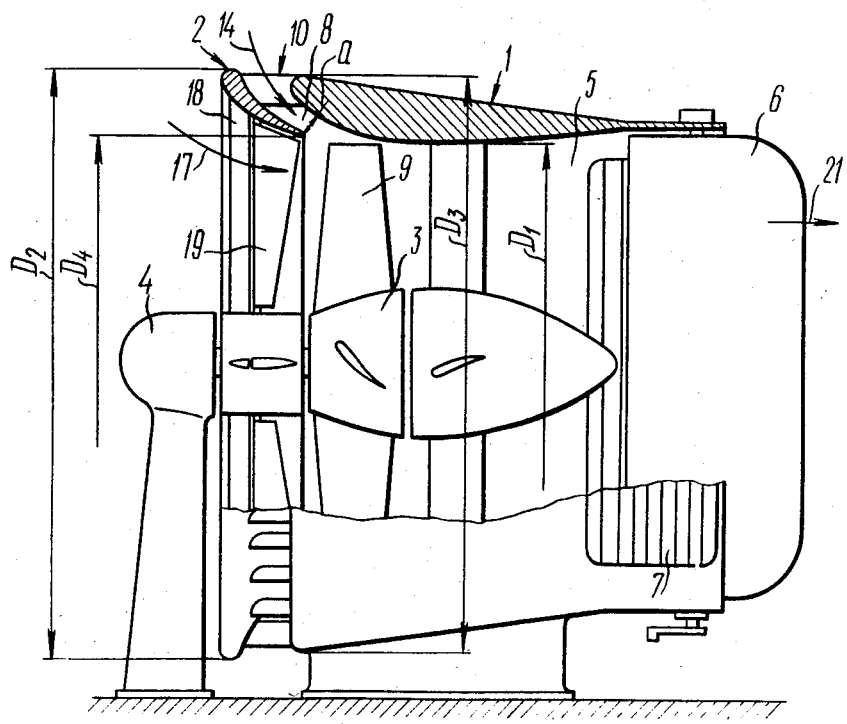
FIG. 1 schematically illustrates a vertical section of a propulsion installation of an air-cushion transport vehicle, according to the invention.

A propulsion installation of an air-cushion transport vehicle, according to the invention, comprises an annular duct 1 (FIG. 1) provided at its entrance with a ring slat 2. Installed at the entrance portion of the annular duct 1 is an axial fan with a wheel 3 rotated by a drive system 4. At the exit portion of the annular duct 1 is disposed a thrust nozzle 5 provided with rotatable shutters 6 and blades 7 for reversing the thrust. The ring slat 2 together with the annular duct 1 forms an annular passage 8 (FIGS. 1, 2) having a height "a" at the exit. The exit of the annular passage 8 is disposed ahead of working blades 9 of the axial fan and positioned in the annular passage 8 is a vane cascade 10 made up of curved plates 11 (FIG. 3), a concave portion 12 of each of which is directed toward a pressure side 13 of the working blades 9 (FIGS. 3, 4). The vane cascade 10 (FIGS. 1, 2) installed in the annular passage 8 performs two main functions aimed at increasing the capacity of the axial fan with the wheel 3, in which case an increase in the fan capacity leads to a respective increase of the reactive thrust produced by the propulsion installation.

The first function of the vane cascade 10 is that the plates 11 (FIG. 3) impart a spin to the air flow entering the annular passage 8 (FIG. 2), in the direction opposite to rotation of the working blades 9. This is accomplished due to the fact the plates 11 (FIG. 3) have the concave portion 12 which ensures diversion of the air flow entering the annular passage 8 (FIG. 2), in a direction 14 (FIG. 3) against a direction 15 of rotation of the wheel 3. As is known, such direction 14 of the air flow brings about, in practice, a rise in the aerodynamic load on the working blades 9. In the given case, this causes a rise in the air flow velocity at the peripheral portion of the working blades 9, approximately confined by the height "a" of the annular passage 8, which in its turn aids in increasing the capacity and accordingly, in augmenting the reactive thrust of a propulsion installation of the transport vehicle moving forward.

The second function of the vane cascade 10 is that it ensures a stable operation of the axial fan without a developed separation of the air flow at the periphery of the working blades 9 in the case of a substantial increase in the aerodynamic resistance in the air channel of the thrust nozzle 5, which occurs at thrust reversing modes when the thrust nozzle 5 is closed by the shutters 6 and the blades 7 (FIG. 1). At these modes, the pressure of air in the thrust nozzle 5 and, accordingly, after the working blades 9 rises and in case of large angles α (FIG. 4) of the working blades 9 in the range of 20° to 40°, a separation of the air flow occurs at the periphery of the working blades 9. As is known from practice, a separated air flow having a substantial velocity of spinning in the direction 15 (FIG. 3) of rotation of the wheel 3 moves, in the given case, in a direction 16 (FIGS. 2, 3). Owing to the vane cascade 10 with the curved plates 11 (FIG. 3), the separated air flow is straightened and ejected outside of the annular duct 1 (FIG. 2) without exerting an adverse affect of spinning on the main portion of the air flow passing into the entrance section of the ring slat 2 in a direction 17. Due to this, a further separation of the air flow does not develop at the periphery of the working blades 9 and the axial fan continues to operate steadily, thereby delivering a large amount of air to the thrust nozzle 5, which aids in augmenting the reactive thrust of the propulsion installation of the transport vehicle moving in reverse.

Thus, the provision of the vane cascade 10 having the curved plates 11 makes it possible to use the wheel 3 having the large 20° to 40° angles α (FIG. 4) of the working blades 9, owing to which the axial fan installed in the annular duct 1 (FIG. 1) with the ring slat 2, produces the reactive thrust of the propulsion installation exceeding by 15 to 25 percent that of a similar propulsion installation having no vane cascade 10.

In the optimal case the height "a" of the annular passage 8 at the exit may comprise 5 to 15 percent of an inside diameter $D_1$ of the annular duct 1. The height "a" of the annular passage 8 may effect the increase of the reactive thrust of the propulsion installation. With an increase in the value "a", the reactive thrust is increased, as in this case, the mass of a spinned air flow passing through the annular passage 8 is increased.

The ratio of an outside diameter $D_2$ of the ring slat 2 to an outside diameter $D_3$ of the annular duct 1 ranges from 0.9 to 1.1. These ratios are governed by the travelling speed of an air-cushion transport vehicle.

At a high travelling speed of the transport vehicle, the ratio $D_2/D_3$ may be taken in the neighbourhood of 0.9, in which case the frontal aerodynamic resistance of the annular duct 1 will be reduced. However, the reactive thrust produced by the propulsion installation at a low travelling speed with the ratio $D_2/D_3$ being in the neighbourhood of 0.9, will be somewhat decreased.

At a low travelling speed, the ratio $D_2/D_3$ may be taken up to 1.1, in which case the frontal aerodynamic resistance of the annular duct 1 will be somewhat increased, while the reactive thrust will be substantially increased.

The ratio of an inside diameter $D_4$ of the ring slat 2 to the inside diameter $D_1$ of the annular duct 1 may suitably be from 1.0 to 1.1.

With this ratio $D_4/D_1$, an optimum axial length of the ring slat 2 is selected depending on the accepted ratio $D_2/D_3$.

In those cases when the wheel 3 has the fixed working blades 9, the capacity of an axial fan and consequently, the produced reactive thrust may be regulated by the guide blades (FIGS. 1, 4) installed in the internal flow area of the ring slat 2 and comprised of a stationary support 18 and a rotatable flap 19 turned to a position 20.

The propulsion installation of an air-cushion transport vehicle operates in the following way.

The drive system 4 (FIG. 1) rotates the wheel 3 of the axial fan due to which air is drawn in the annular duct 1 provided with the ring slat 2, in the directions 14 and 17, passes the working blades 9, enters the thrust nozzle 5 and is ejected through the open shutters 6 in the direction 21, thereby producing the reactive thrust which imparts translatory motion to the transport vehicle.

When it is required to obtain a reverse thrust, the shutters 6 are turned to close the section of the thrust nozzle 5 and the air is ejected outside through the reversing blades 7, thereby producing the reverse thrust. In this case, the pressure of air rises in the thrust nozzle 5 and after the working blades 9, thus causing separation of the air flow on the working blades 9, which is localized, as described above, by the action of the vane cascade 10 installed in the annular passage 8.

Owing to this, the flow separation mode is not developed and the axial fan operates steadily.

When it is required to change the value of the reactive thrust, the working blades 9 may be turned to a position 22 (FIG. 4). If the wheel 3 (FIG. 3) is made with the fixed working blades 9, the value of the reactive thrust may be changed through the medium of the flaps 19 of the guide blades (FIG. 4), by turning the latter to the position 20.

However, in a number of cases and particularly on air-cushion vehicles of low load-carrying capacity, the use is made of combined lift and propulsion installations. In this case, the lift and propulsion installation will incorporate the heretofore described annular duct with the ring slat.

An embodiment of the combined lift and propulsion installation with the annular duct and the ring slat will now be considered as applied to the present invention.

Figure 5:
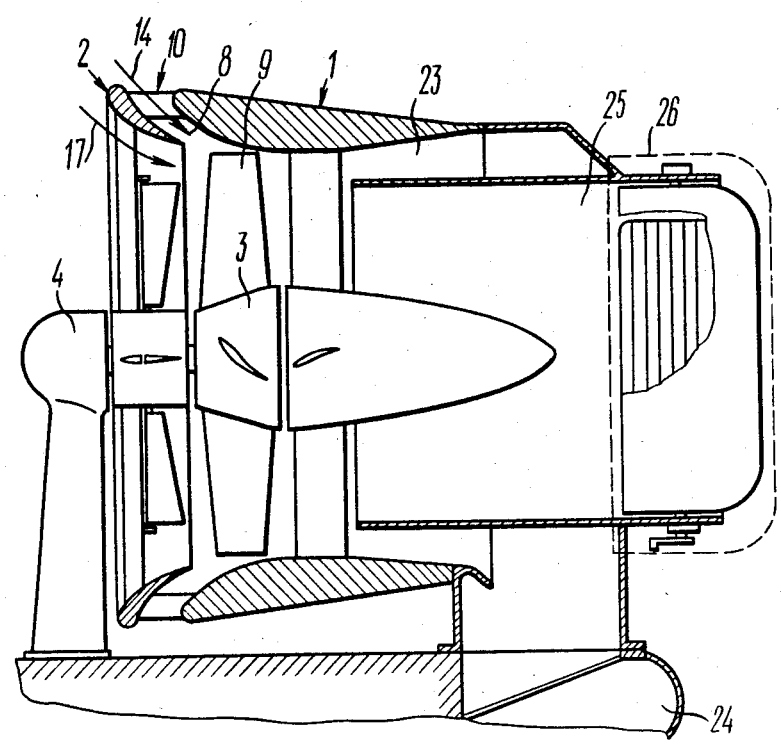
FIG. 5 is a vertical section illustrating an embodiment of a lift and propulsion installation with a ring slat.

In a combined lift and propulsion installation of an air-cushion transport vehicle, comprising the wheel 3 (FIG. 5) installed in the annular duct 1 with the ring slat 2 and the vane cascade 10 installed in the annular passage 8, the air flow after the working blades 9 is divided and passes into an external annular passage 23 connected with an air cushion 24, and into a thrust nozzle 25 provided with a reversing-and-steering device 26. In this case, the pressure of air after the working blades 9 may rise with variation of the aerodynamic resistance in channels of the annular passage 23 and the thrust nozzle 25; however, in this case, there will be no separation of the air flow on the working blades 9 due to the action of the vane cascade 10, as described above.

In other respects pertinent to increase of the produced thrust and stable operation at increased aerodynamic loads on the working blades 9, the combined lift and propulsion installation will operate in the same way as the heretofore described propulsion installation of FIG. 1.

Thus, the disclosed embodiments of the propulsion installation and the combined lift and propulsion installation with the annular duct 1 provided with the ring slat 2 and the vane cascade 10, make it possible to obtain a substantial increase of the reactive thrust as compared to the known similar installations, with the diameters of wheels of the axial fan being equal.

What is claimed is:

1. A propulsion installation of an air-cushion transport vehicle, comprising: an annular duct; an axial fan with working blades installed in said annular duct which provides an area of elevated pressure in said annular duct at the discharge side of said axial fan; a ring slat disposed before said annular duct; an annular passage formed between said annular duct and said ring slat, with the exit of said annular passage being located ahead of said working blades and adjacent the peripheral portions thereof, and the inlet of said annular passage being outside the area of elevated pressure at the discharge side of said axial fan; a vane cascade positioned in said annular passage and made up of curved vanes, a concave portion of each one of which is directed toward a pressure side of the peripheral portions of said working blades, said vanes being oriented to impart a spin, in a direction opposite the direction of rotation of said working blades, to the air flow entering said annular passage.

2. A propulsion installation of an air-cushion transport vehicle according to claim 1, wherein a height of said annular passage at the exit comprises 5 to 15 percent of the inside diameter of said annular duct.

3. A propulsion installation of an air-cushion transport vehicle according to claim 1, wherein the ratio of the outside diameter of said ring slat to the outside diameter of said annular duct ranges from 0.9 to 1.1 while the ratio of the inside diameter of said ring slat to the inside diameter of said annular duct ranges from 1.0 to 1.1.

4. A propulsion installation of an air-cushion transport vehicle of claim 1 comprising: a ring slat which forms an annular passage between the outside of the ring slat and said annular duct and has a flow area inside of said ring slat, which communicates with said annular duct, wherein rotatable guide vanes are located in the flow area of said ring slat.

5. A propulsion installation of an air-cushion transport vehicle of claim 3 comprising a ring slat which forms an annular passage between the outside of the ring slat and said annular duct and has a flow area inside of said ring slat, which communicates with said annular duct, wherein rotatable guide vanes are located in the flow area of said ring slat.

* * * * *